April 7, 1931. C. A. CAMPBELL 1,799,730
FLUID PRESSURE BRAKE
Filed Nov. 7, 1929  2 Sheets-Sheet 1

Charles A. Campbell Inventor

By Dodge and Sons Attorneys

April 7, 1931.  C. A. CAMPBELL  1,799,730
FLUID PRESSURE BRAKE
Filed Nov. 7, 1929  2 Sheets-Sheet 2
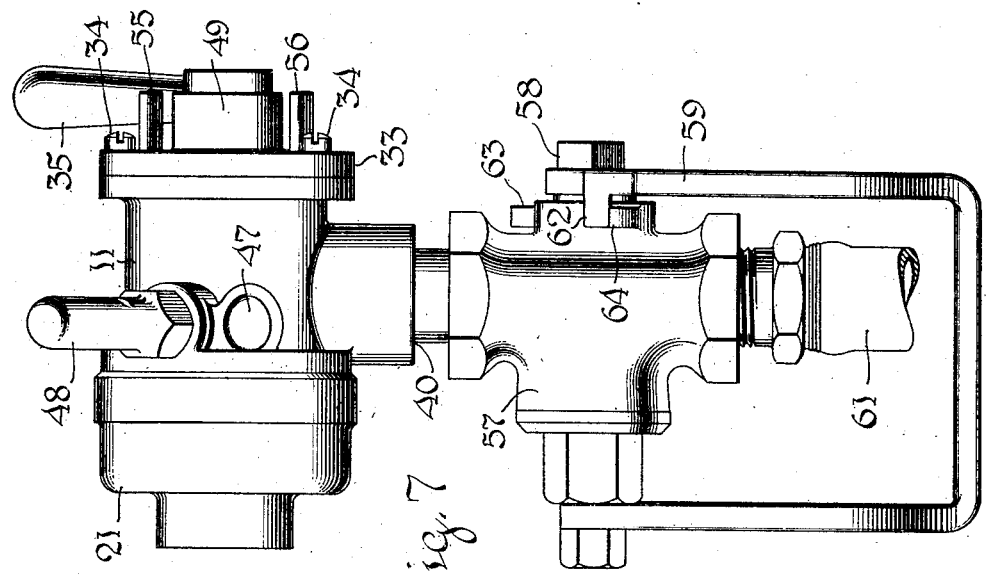
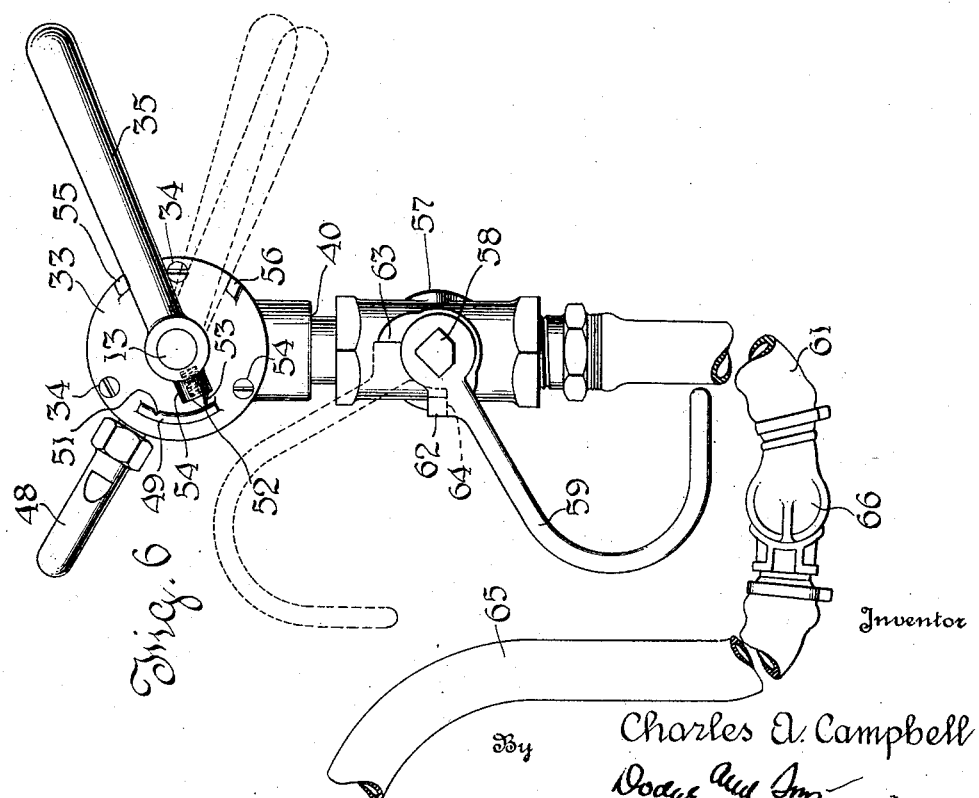
Inventor
Charles A. Campbell
By Dodge and Sons
Attorneys Patented Apr. 7, 1931

1,799,730

UNITED STATES PATENT OFFICE

CHARLES ALBERT CAMPBELL, OF WATERTOWN, NEW YORK, ASSIGNOR TO THE NEW YORK AIR BRAKE COMPANY, A CORPORATION OF NEW JERSEY

FLUID-PRESSURE BRAKE

Application filed November 7, 1929. Serial No. 405,487.

The present invention relates to air brake valves, and more particularly to a back-up valve, that is, a valve disposed at the end of a train and adapted to apply the brakes while the train is being backed into a station or yard.

The invention comprises a rotary valve having a plurality of port openings so arranged that, by means of suitable valve control mechanism, the valve is held in brake release position by hand and moves automatically to emergency application position if released. A signal or whistle is blown in one position of the valve, preferably a position where the brake valve is closed and the brakes thus maintained in release.

A further feature of the invention is the provision of a cock, associated with the valve, for closing the air line to the valve except when the valve is hung on a rail or other support at the end of the train.

The invention will be more clearly understood from the following description, taken with the accompanying drawings, in which,—

Fig. 6 is an end elevation of the valve including the cut-off cock attached thereto, the open position of the hanger yoke being indicated by dotted lines; and Fig. 7 is a side elevation corresponding to Fig. 6 but drawn to a larger scale.

Figure 1:
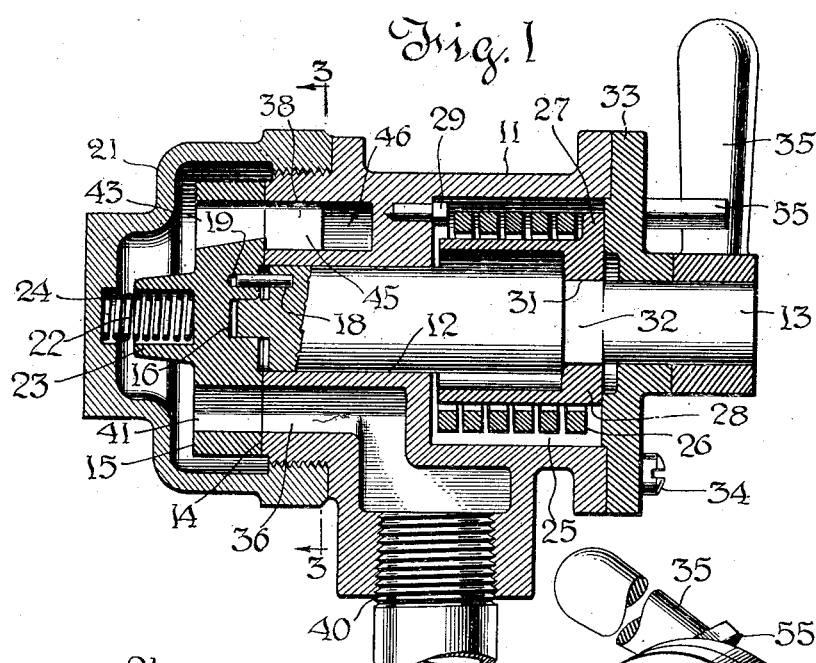
Fig. 1 is an axial section of the rotary valve.

Referring to the drawings, the valve comprises a body or casing 11, bored centrally at 12 to provide a bearing for the shaft 13. One end of the casing is finished to provide a seat 14 for a rotary disk 15 which is slotted at 16 to receive a tongue 17 on the end of shaft 13. A dowel pin 18 on the shaft cooperates with a hole 19 in the disk to preclude incorrect assembly of the valve parts. A cap 21 closes the casing. The disk 15 is held against seat 14 by a spring 22 seated in a recessed boss 23 on the disk and a depression 24 in the closure cap.

At its other end the casing is recessed at 25 to receive a torque spring 26, the ends of which cooperate with a lug 27 on collar 28 and pin 29 secured in the casing. The collar 28 is broached at 31 to fit a squared portion 32 of shaft 13 so that the spring normally urges the shaft and valve disk 15 to brake application position. This end of the casing is closed by a cover plate 33 held to the casing by screws 34 and a handle 35 is keyed or otherwise secured to the shaft 13 which projects through the cover plate.

Figure 2:
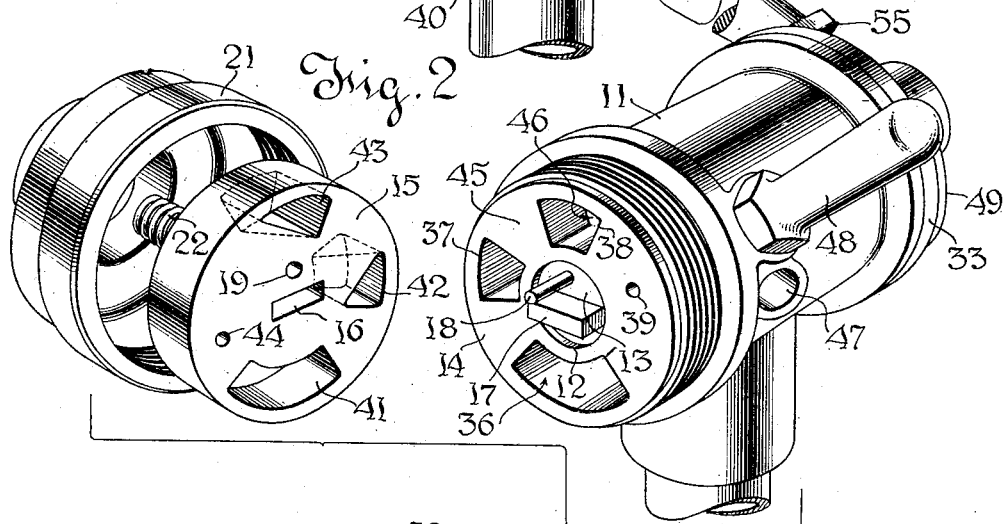
Fig. 2 is a perspective view of the valve ports shown partly dismounted.

Referring to Fig. 2, it will be seen that the end of casing 11 and disk 15 are each provided with longitudinal apertures or ports, those in the casing being indicated at 36, 37, 38 and 39, and the ports in the disk being numbered 41, 42, 43 and 44. Ports 36, and 41 are segmental and extend through relatively large arcs on the casing and disk respectively, the former communicating with the air line through the tapped inlet 40, and the latter with the space between the cap 21 and the bearing face of valve disk 15. Ports 36 and 41 communicate with each other in all positions of the valve 15. The ports 37, 38, are spaced from each other by a bridge 45, but both lead to an arcuate passage 46 in casing 11 terminating in an exhaust opening 47 in the side of the casing. The reason for using two ports 37, 38 is to reduce the necessary angular motion of the valve 15 between closed and full open positions.

Ports 42, 43 in the disk are substantially triangular in shape on the face of the disk which abuts the seat 14. The purpose is to secure slow initial opening permitting a graduated opening, and hence service application of the brakes.

The ports 39 and 44 are relatively small and are designed to permit a limited amount of air from the supply pipe to actuate a whistle 48 when alined. In order to indicate to the operator that the ports 39 and 44 are in alinement a segmental boss 49 on the cover 33 is notched at 51 to engage the point 52 of a plunger 53 in the extension 54 of the valve operating handle 35. The plunger is normally forced outwardly by a small spring (see Fig. 6) and engages notch 49 when the ports 39 and 44 are in alinement. The spring which forces the plunger outward is not sufficiently strong to prevent the valve from being moved to brake application position by torque spring 26 so that the valve will be moved directly from release to application position, if for any reason, the manual pressure on the valve handle is released. The angular movement of the handle 35 is limited by stops 55, 56 on the cover plate 33, stop 55 holding the handle in brake application position, while stop 56 indicates to the operator that the brake is in release position.

Since the valve is normally urged to brake application position by the torque spring, it is necessary that a cut-off cock be inserted in the air line when the valve is attached to the train pipe hose. There is, therefore, provided a rotary plug cock 57 having squared end portions 58 engaged by a bail shaped handle 59 which straddles the valve body and is hooked to engage the platform rail. The valve is adapted to be moved through an angle of 90° to open and close the air hose 61 to the brake valve, a lug 62 being formed on the handle for engaging stop shoulders 63, 64 on the valve body and thus limit the angular movement of the handle 59. As illustrated in Fig. 6 the closed position of the handle is indicated by full lines while the open position, that is, the position of the handle when the device is hung on a platform rail, is shown in dotted lines. The assembled brake valve and cut-off cock is connected to the air line 65 by the end coupling 66.

In operating the valve the operator first moves the brake valve handle to release position, after which the hooked handle of the cut-off cock is raised to open the cock. The device may then be hung on the platform rail. While the brake valve is being held against stop 56, as indicated by the lower dotted line in Fig. 6, the ports are in the relative positions shown in Fig. 3, at which time port 43 overlies wall 45 and ports 41, 42 are in communication with passage 36 and air inlet 40. The compressed air in the valve therefore has no outlet.

Figure 3:
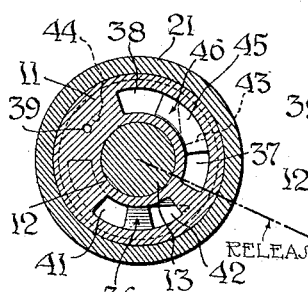
Figs. 3, 4 and 5 are sectional views taken on line 3—3 of Fig. 1, the parts being shown in release, signal and application positions respectively.
Figure 4:
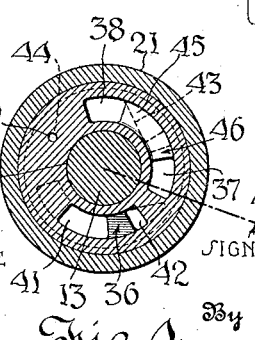

In Fig. 4 the ports are shown in practically the same relation as that described with reference to Fig. 3 except that the small openings 39, 44 are alined, thus permitting air to pass to whistle 48. As hereinbefore explained, the plunger 53 on the valve handle engages the notch 51 when the ports 39, 44 are in the position shown in Fig. 4.

Figure 5:
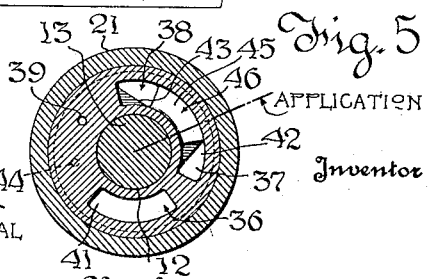

Fig. 5 illustrates the respective positions of the several ports in brake application position. Here ports 42, 43 overlie the openings 37, 38 and ports 36, 41 are in alinement. In this position of the valve, air passes from air inlet 40 through all of the ports, except the signal ports, to the exhaust 47. It is to be noted that ports 42, 43, as before stated, are substantially triangular in shape to permit gradual opening of the valve. Although the ports 42, 43 are illustrated as being spaced substantially the same distance as ports 37, 38, they may be spaced further apart to obtain even more gradual opening of the valve. It is also to be noted that ports 36 and 41 are open to each other at all times so that as long as the cut-off cock is open, the space between the closure cap 21 and the valve disk is in constant communication with the air line.

The purpose of the cock 57 is to facilitate attachment of the back-up valve. When the device is first attached, the cock 57 is in closed position so that when the angle cock at the end of the train is opened the brakes are not affected. The operator is thus able to attach the back-up valve and get to his position on the platform without interfering with the brakes. Once there, he shifts handle 35 to release position, opens cock 57 and hangs the device on the handle hook 59. In removing the device, the operation is similar, first the cock 57 and then the angle cock being closed before detaching the device from the air hose.

From the description of the device and its operation it will be apparent that the present invention provides for a back-up valve of the dead-man type in which is also incorporated a signal control. There is also combined with the brake valve a cut-off cock interposed between the brake valve and air line and which, when the device is hung on the platform rail, is opened to permit operation of the brake valve. The arrangement and shape of the valve ports provides for gradual application of the brakes by manual control, but if, for any reason, the operator is incapacitated, the torque spring immediately opens the valve to initiate emergency application of the brakes.

A preferred embodiment of the invention has been illustrated and described, but it is to be understood that the details may be modified to meet operating conditions.

What is claimed is:—

1. In a back-up valve, the combination of a casing; means for releasably connecting said casing with a brake pipe; a valve in said casing serving when open to vent said brake pipe to atmosphere; a spring constantly urging said valve to venting position; and a handle for closing said valve against the action of said spring.

2. In a back-up valve, the combination of a casing; means for releasably connecting said casing with a brake pipe; a valve in said casing serving when open to vent said brake pipe to atmosphere; a spring constantly urging said valve to venting position; a handle for closing said valve against the action of said spring; a second valve adjacent the first, said second valve when closed precluding the venting action of the first valve; and supporting means for said valves connected with the second valve and arranged to hold the same open when said supporting means is in use.

3. In a back-up valve, the combination of a casing having a brake pipe connection and a valve seat formed with an exhaust port and a signal port; a ported valve shiftable on said seat and serving to connect said brake pipe connection in one position with said exhaust port, in another position with said signal port, and in a third position to disconnect said brake pipe connection from both said ports; yielding means constantly urging said valve to the first named position; a handle by means of which said valve may be shifted to said other positions; and an air operable signal connected with said signal port.

4. In a back-up valve, the combination of a casing having a brake pipe connection and a valve seat formed with a plurality of exhaust ports and a signal port; a ported valve shiftable on said seat and serving to connect said brake pipe connection in one position with said exhaust ports, in another position with said signal port, and in a third position to disconnect said brake pipe connection from all of said ports; yielding means constantly urging said valve to the first named position; a handle by means of which said valve may be shifted against said yielding means to said other positions; an air operable signal connected with said signal port; and means for releasably connecting the brake pipe connection of said casing with a brake pipe.

5. In a back-up valve, the combination of a casing having a brake pipe connection and a valve seat formed with an exhaust port and a signal port; a ported valve shiftable on said seat and serving to connect said brake pipe connection in one position with said exhaust port, in another position with said signal port, and in a third position to disconnect said brake pipe connection from both said ports; yielding means constantly urging said valve to the first-named position; a handle by means of which said valve may be shifted to said other positions; an air operable signal connected with said signal port; means for releasably connecting the brake pipe port of said casing with a brake pipe; stops for defining the limiting positions of said valve; and an impositive detent for indicating the intermediate position of said valve.

6. In a back-up valve, the combination of a casing having a brake pipe connection and a valve seat formed with a plurality of exhaust ports and a signal port; a ported valve shiftable on said seat and serving to connect said brake pipe connection in one position with said exhaust ports, in another position with said signal port, and in a third position to disconnect said brake pipe connection from all of said ports; yielding means constantly urging said valve to the first-named position; a handle by means of which said valve may be shifted against said yielding means to said other positions; an air operable signal connected with said signal port; means for releasably connecting the brake pipe port of said casing with a brake pipe; stops for defining the limiting positions of said valve; and an impositive detent for indicating the intermediate position of said valve.

7. In a back-up valve, the combination of a casing having a brake pipe connection and a valve seat formed with an exhaust port, and a signal port; a ported valve shiftable on said seat and serving to connect said brake pipe connection in one position with said exhaust port, in another position with said signal port, and in a third position to disconnect said brake pipe connection from both said ports; yielding means constantly urging said valve to the first-named position; a handle by means of which said valve may be shifted to said other positions; an air operable signal connected with said signal port; means for releasably connecting the brake pipe port of said casing with a brake pipe; a second valve adjacent said casing, and when closed serving to preclude the venting flow therethrough; and a combined support and actuator for the second valve arranged to maintain said second valve open when in supporting position.

8. In a back-up valve, the combination of a casing having a brake pipe connection and a valve seat formed with a plurality of exhaust ports, and a signal port; a ported valve shiftable on said seat and serving to connect said brake pipe connection in one position with said exhaust ports, in another position with said signal port, and in a third position to disconnect said brake pipe connection from all of said ports; yielding means constantly urging said valve to the first-named position; a handle by means of which said valve may be shifted against said yielding means to said other positions; an air operable signal connected with said signal port; means for releasably connecting the brake pipe port of said casing with a brake pipe; a second valve adjacent said casing, and when closed serving to preclude the venting flow therethrough; and a combined support and actuator for the second valve arranged to maintain said second valve open when in supporting position.

9. In a back-up valve, the combination of a casing having a brake pipe connection and a seat provided with an exhaust port; a ported valve shiftable on said seat alternately to connect and isolate said brake pipe connection to and from said exhaust port, at least one port being tapered to produce a slow-opening characteristic; a spring urging said valve in an exhaust opening direction; and a handle for shifting said valve.

10. In a back-up valve, the combination of a casing having a brake pipe connection and a seat provided with a plurality of exhaust ports; a ported valve shiftable on said seat alternately to connect and isolate said brake pipe connection to and from said exhaust ports, at least one port being tapered to produce a slow-opening characteristic; a spring urging said valve in an exhaust opening direction; and a handle for shifting said valve.

In testimony whereof I have signed my name to this specification.

CHARLES ALBERT CAMPBELL.